United States Patent
Schrader et al.

(10) Patent No.: US 9,140,475 B2
(45) Date of Patent: Sep. 22, 2015

(54) RECEIVER TANK PURGE IN VAPOR COMPRESSION COOLING SYSTEM WITH PUMPED REFRIGERANT ECONOMIZATION

(71) Applicant: Liebert Corporation, Columbus, OH (US)

(72) Inventors: Timothy J. Schrader, Irwin, OH (US); Greg Haggy, Gahanna, OH (US); Stephen Sillato, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 157 days.

(21) Appl. No.: 14/078,821

(22) Filed: Nov. 13, 2013

(65) Prior Publication Data

US 2014/0157821 A1    Jun. 12, 2014

Related U.S. Application Data

(60) Provisional application No. 61/734,416, filed on Dec. 7, 2012.

(51) Int. Cl.
| | |
|---|---|
| *F25B 39/04* | (2006.01) |
| *F25B 49/02* | (2006.01) |
| *F25B 23/00* | (2006.01) |
| *F25B 45/00* | (2006.01) |

(52) U.S. Cl.
CPC ............... *F25B 49/02* (2013.01); *F25B 23/00* (2013.01); *F25B 45/00* (2013.01); *F25B 2400/0401* (2013.01); *F25B 2400/0415* (2013.01); *F25B 2400/16* (2013.01); *F25B 2400/19* (2013.01); *F25B 2600/13* (2013.01); *Y02B 30/745* (2013.01)

(58) Field of Classification Search
CPC ........ F25B 39/04; F25B 2400/23; F25B 39/02; F25B 25/005; F25B 41/062
USPC ........... 62/115, 118, 119, 190, 483, 498, 509, 62/512, 519
See application file for complete search history.

(56) References Cited

U.S. PATENT DOCUMENTS

| | | | | |
|---|---|---|---|---|
| 7,602,609 | B2 * | 10/2009 | Spearing et al. | 361/701 |
| 2009/0161312 | A1 * | 6/2009 | Spearing et al. | 361/679.47 |
| 2010/0005831 | A1 * | 1/2010 | Vaisman et al. | 62/470 |
| 2010/0326075 | A1 * | 12/2010 | Fong et al. | 60/650 |

* cited by examiner

*Primary Examiner* — Melvin Jones
(74) *Attorney, Agent, or Firm* — Harness, Dickey & Pierce, P.L.C.

(57) ABSTRACT

A cooling system includes a cooling circuit having an evaporator, a condenser, a compressor, an expansion device, a liquid pump, and a receiver/surge tank coupled between the condenser and the liquid pump. The cooling system has a direct expansion mode and a pumped refrigerant economizer mode. When the cooling system switches from the direct expansion mode to the pumped refrigerant economizer mode, refrigerant is flushed from the refrigerant/surge tank so that the cooling circuit is overcharged when it begins operating in the pumped refrigerant economizer mode.

5 Claims, 4 Drawing Sheets

RECEIVER TANK PURGE IN VAPOR COMPRESSION COOLING SYSTEM WITH PUMPED REFRIGERANT ECONOMIZATION

CROSS-REFERENCE TO RELATED APPLICATIONS

This application claims the benefit of U.S. Provisional Application No. 61/734,416 filed on Dec. 7, 2012. The entire disclosure of the above application is incorporated herein by reference.

FIELD

The present disclosure relates to cooling systems, and more particularly, to high efficiency cooling systems.

BACKGROUND

This section provides background information related to the present disclosure which is not necessarily prior art.

Cooling systems have applicability in a number of different applications where fluid is to be cooled. They are used in cooling gas, such as air, and liquids, such as water. Two common examples are building HVAC (heating, ventilation, air conditioning) systems that are used for "comfort cooling," that is, to cool spaces where people are present such as offices, and data center climate control systems.

A data center is a room containing a collection of electronic equipment, such as computer servers. Data centers and the equipment contained therein typically have optimal environmental operating conditions, temperature and humidity in particular. Cooling systems used for data centers typically include climate control systems, usually implemented as part the control for the cooling system, to maintain the proper temperature and humidity in the data center.

FIG. 1 shows an example of a typical data center 100 having a climate control system 102 (also known as a cooling system). Data center 100 illustratively utilizes the "hot" and "cold" aisle approach where equipment racks 104 are arranged to create hot aisles 106 and cold aisles 108. Data center 100 is also illustratively a raised floor data center having a raised floor 110 above a sub-floor 112. The space between raised floor 110 and sub-floor 112 provides a supply air plenum 114 for conditioned supply air (sometimes referred to as "cold" air) flowing from computer room air conditioners ("CRACs") 116 of climate control system 102 up through raised floor 110 into data center 100. The conditioned supply air then flows into the fronts of equipment racks 104, through the equipment (not shown) mounted in the equipment racks where it cools the equipment, and the hot air is then exhausted out through the backs of equipment racks 104, or the tops of racks 104. In variations, the conditioned supply air flows into bottoms of the racks and is exhausted out of the backs of the racks 104 or the tops of the racks 104.

It should be understood that data center 100 may not have a raised floor 110 nor plenum 114. In this case, the CRAC's 116 would draw in through an air inlet (not shown) heated air from the data center, cool it, and exhaust it from an air outlet 117 shown in phantom in FIG. 1 back into the data center. The CRACS 116 may, for example, be arranged in the rows of the electronic equipment, may be disposed with their cool air supply facing respective cold aisles, or be disposed along walls of the data center.

In the example data center 100 shown in FIG. 1, data center 100 has a dropped ceiling 118 where the space between dropped ceiling 118 and ceiling 120 provides a hot air plenum 122 into which the hot air exhausted from equipment racks 104 is drawn and through which the hot air flows back to CRACs 116. A return air plenum (not shown) for each CRAC 116 couples that CRAC 116 to plenum 122.

CRACs 116 may be chilled water CRACs or direct expansion (DX) CRACs. CRACs 116 are coupled to a heat rejection device 124 that provides cooled liquid to CRACs 116. Heat rejection device 124 is a device that transfers heat from the return fluid from CRACs 116 to a cooler medium, such as outside ambient air. Heat rejection device 124 may include air or liquid cooled heat exchangers. Heat rejection device 124 may also be a refrigeration condenser system, in which case a refrigerant is provided to CRACs 116 and CRACs 116 may be phase change refrigerant air conditioning systems having refrigerant compressors, such as a DX system. Each CRAC 116 may include a control module 125 that controls the CRAC 116.

In an aspect, CRAC 116 includes a variable capacity compressor and may for example include a variable capacity compressor for each DX cooling circuit of CRAC 116. It should be understood that CRAC 116 may, as is often the case, have multiple DX cooling circuits. In an aspect, CRAC 116 includes a capacity modulated type of compressor or a 4-step semi-hermetic compressor, such as those available from Emerson Climate Technologies, Liebert Corporation or the Carlyle division of United Technologies. CRAC 116 may also include one or more air moving units 119, such as fans or blowers. The air moving units 119 may be provided in CRACs 116 or may additionally or alternatively be provided in supply air plenum 114 as shown in phantom at 121. Air moving units 119, 121 may illustratively have variable speed drives.

A typical CRAC 200 having a typical DX cooling circuit is shown in FIG. 2. CRAC 200 has a cabinet 202 in which an evaporator 204 is disposed. Evaporator 204 may be a V-coil assembly. An air moving unit 206, such as a fan or squirrel cage blower, is also disposed in cabinet 202 and situated to draw air through evaporator 204 from an inlet (not shown) of cabinet 202, where it is cooled by evaporator 204, and direct the cooled air out of plenum 208. Evaporator 204, a compressor 210, a condenser 212 and an expansion valve 214 are coupled together in known fashion in a DX refrigeration circuit. A phase change refrigerant is circulated by compressor 210 through condenser 212, expansion valve 214, evaporator 204 and back to compressor 210. Condenser 212 may be any of a variety of types of condensers conventionally used in cooling systems, such as an air cooled condenser, a water cooled condenser, or glycol cooled condenser. It should be understood that condenser 212 is often not part of the CRAC but is located elsewhere, such as outside the building in which the CRAC is located. Compressor 210 may be any of a variety of types of compressors conventionally used in DX refrigeration systems, such as a scroll compressor. When evaporator 204 is a V-coil or A-coil assembly, it typically has a cooling slab (or slabs) on each leg of the V or A, as applicable. Each cooling slab may, for example, be in a separate cooling circuit with each cooling circuit having a separate compressor. Alternatively, the fluid circuits in each slab such as where there are two slabs and two compressor circuits, can be intermingled among the two compressor circuits.

Evaporator 204 is typically a fin-and-tube assembly and is used to both cool and dehumidify the air passing through them. Typically, CRAC's such as CRAC 200 are designed so that the sensible heat ratio ("SHR") is typically between 0.85 and 0.95.

A system known as the GLYCOOL free-cooling system is available from Liebert Corporation of Columbus, Ohio. In this system, a second cooling coil assembly, known as a "free cooling coil," is added to a CRAC having a normal glycol system. This second coil assembly is added in the air stream ahead of the first cooling coil assembly. During colder months, the glycol solution returning from the outdoor dry-cooler is routed to the second cooling coil assembly and becomes the primary source of cooling to the data center. At ambient temperatures below 35 deg. F., the cooling capacity of the second cooling coil assembly is sufficient to handle the total cooling needs of the data center and substantially reduces energy costs since the compressor of the CRAC need not be run. The second or free cooling coil assembly does not provide 100% sensible cooling and has an airside pressure drop similar to the evaporator (which is the first cooling coil assembly).

Efficiency of cooling systems has taken on increased importance. According to the U.S. Department of Energy, cooling and power conversion systems for data centers consume at least half the power used in a typical data center. In other words, less than half the power is consumed by the servers in the data center. This has led to increased focus on energy efficiency in data center cooling systems.

SUMMARY

In accordance with an aspect of the present disclosure, a cooling system includes a cabinet having an air inlet and an air outlet and a cooling circuit that includes an evaporator disposed in the cabinet, a condenser, a compressor, an expansion device, a liquid pump, and a receiver/surge tank coupled between the condenser and the liquid pump. The cooling system has a direct expansion mode wherein the compressor is on and compresses a refrigerant in a vapor phase to raise its pressure and thus its condensing temperature and refrigerant is circulated around the cooling circuit by the compressor. The cooling system also has a pumped refrigerant economizer mode wherein the compressor is off and the liquid pump is on and pumps the refrigerant in a liquid phase and refrigerant is circulated around the cooling circuit by the liquid pump and without compressing the refrigerant in its vapor phase. When the cooling system switches from the direct expansion mode to the pumped refrigerant economizer mode, refrigerant is flushed from the refrigerant/surge tank. In an aspect, the cooling system has a controller coupled to the liquid pump and the compressor that turns the compressor off and the liquid pump on to operate the cooling circuit in the pumped refrigerant economizer mode and turns the compressor on to operate the cooling circuit in the direct expansion mode.

In aspect, the cooling circuit includes a controlled valve, controlled by the controller, at an inlet of the receiver/surge tank, a check valve coupled between an outlet of the receiver/surge tank and an inlet of the pump, and a bypass line coupled between an inlet of the controlled valve and a junction of the outlet of the check valve and an inlet of the pump. The controlled valve is open when the cooling system is in the direct expansion mode and closed when the cooling system is in the pumped refrigerant economizer mode. When the cooling system switches from the direct expansion mode to the pumped refrigerant economizer mode, the controlled valve is closed by the controller, the compressor is then turned off by the controller and after the compressor is turned off, the pump is turned on by the controller.

In an aspect, the controlled valve is a solenoid valve. In an aspect, the controlled valve is a motorized ball valve. In an aspect, the controlled valve is a variable flow valve.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In accordance with an of the present disclosure, a cooling system, which may include a CRAC, includes a DX cooling circuit with a pumped refrigerant economizer and a receiver/surge tank enabling the system to be run in a pumped refrigerant economizer mode when the temperature outside is cold enough to cool the cooling fluid circulating in the cooling circuit and bypass the compressor. The cooling fluid may illustratively be a phase change refrigerant having a vapor phase and a liquid phase. The pumped refrigerant economizer may illustrativley include a pump that circulates the cooling fluid, illustratively the refrigerant in its liquid phase, with the compressor bypassed. This cooling system then uses the pump instead of the compressor to pump the refrigerant in its liquid phase and circulate the refrigerant when the outside air temperature is low enough to provide the heat exchange without compressing the refrigerant in its vapor phase to a higher pressure/condensing temperature. The receiver/purge tank is purged of refrigerant when the cooling system switches from a DX mode to the pumped refrigerant economizer mode.

Figure 1:
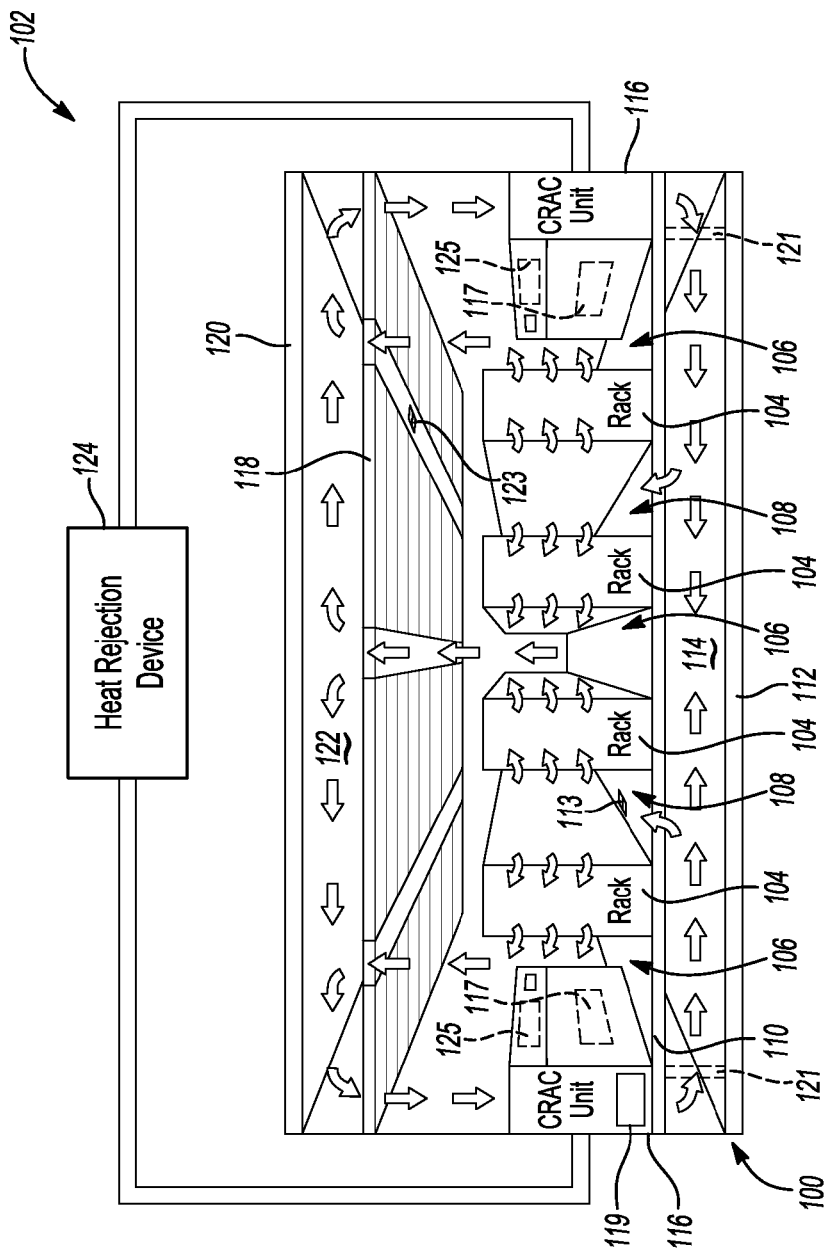
FIG. 1 is a schematic illustrating a prior art data center.
Figure 2:
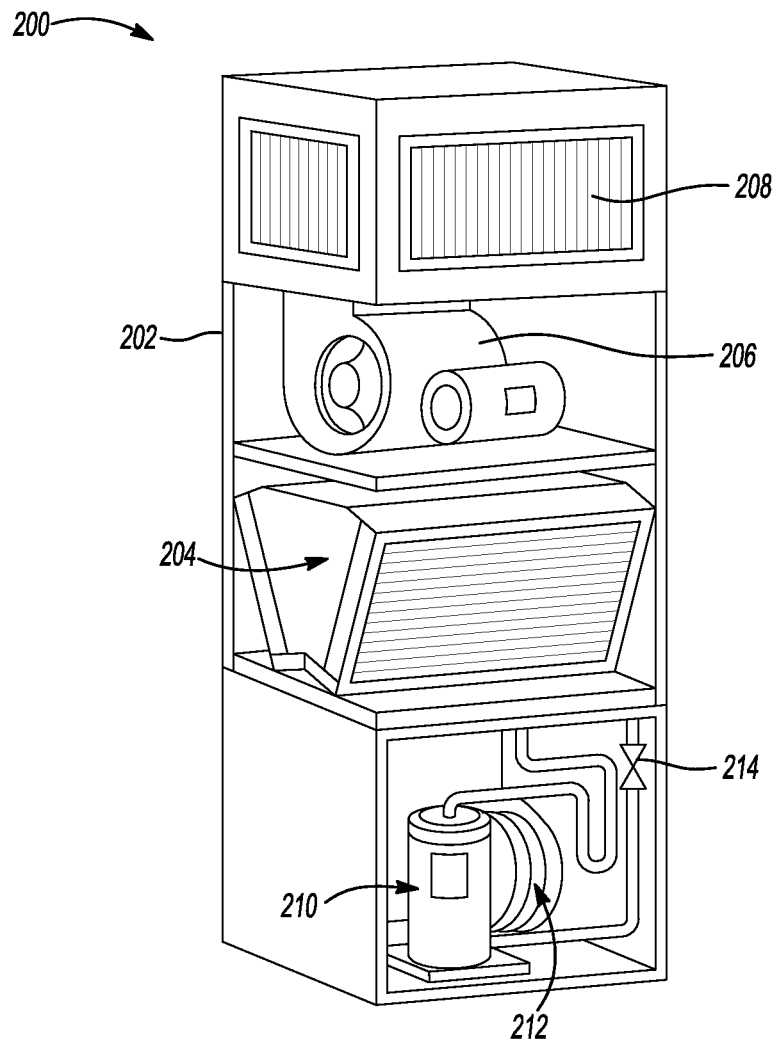
FIG. 2 is a simplified perspective view of a prior art CRAC having a DX cooling circuit.
Figure 3:
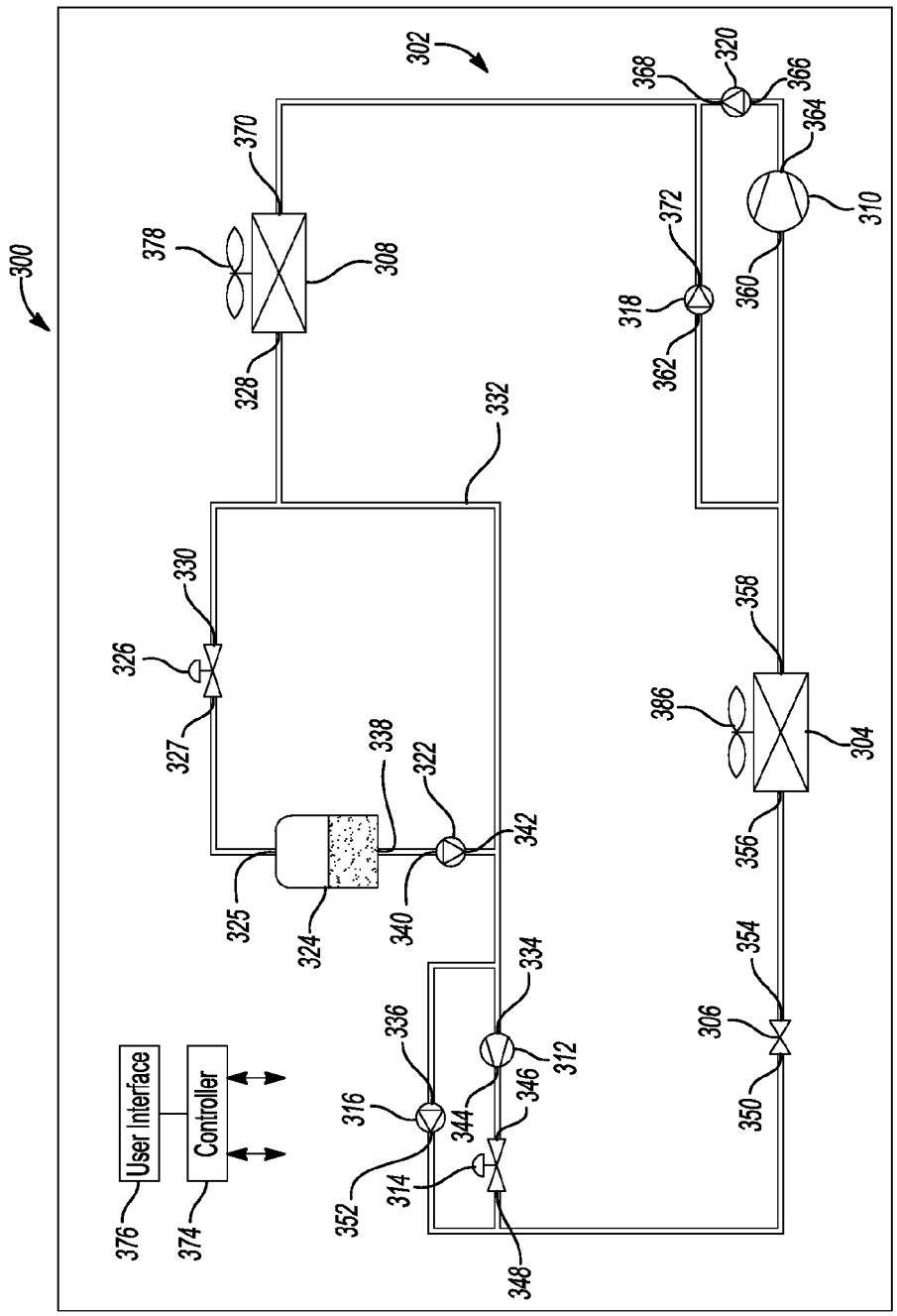
FIG. 3 is a cooling system having a DX cooling circuit with a pumped refrigerant economizer and a receiver/surge tank wherein the receiver/surge tank is purged when the cooling system is switched from a DX mode to a pumped refrigerant economizer mode in accordance with an aspect of the present disclosure.

With reference to FIG. 3, an embodiment of a cooling system 300 in accordance with an aspect of the present disclosure is shown. Cooling system 300 includes a DX cooling circuit 302 having an evaporator 304, expansion valve 306 (which may preferably be an electronic expansion valve but may also be a thermostatic expansion valve), condenser 308 and compressor 310 arranged in a DX refrigeration circuit. Cooling circuit 302 also includes a fluid pump 312, solenoid valve 314, check valves 316, 318, 320, and 322, receiver/surge tank 324 and solenoid valve 326. An outlet 328 of condenser 308 is coupled to an inlet 330 of a solenoid valve 326 and by bypass line 332 to an inlet 334 of pump 312 and to an inlet 336 of check valve 316. An outlet 327 of solenoid valve 326 is coupled to an inlet 325 of receiver/surge tank 324. An outlet 338 of receiver/surge tank 324 is coupled to an inlet 340 of check valve 322 and an outlet 342 of check valve 322 is coupled to inlet 334 of pump 312. Check valve 322 only allows refrigerant flow out from outlet 338 of receiver/surge tank 324. An outlet 344 of pump 312 is coupled to an inlet 346 of solenoid valve 314. An outlet 348 of solenoid valve 314 is coupled to an inlet 350 of electronic expansion valve 306. An outlet 352 of check valve 316 is also coupled to the inlet 350 of electronic expansion valve 306. An outlet 354 of electronic expansion valve 306 is coupled to a refrigerant inlet 356 of evaporator 304. A refrigerant outlet 358 of evaporator 304 is coupled to an inlet 360 of compressor 310 and to an inlet 362 of check valve 318. An outlet 364 of compressor 310 is coupled to an inlet 366 of check valve 320 and an outlet 368 of check valve 320 is coupled to an inlet 370 of condenser 308 as is an outlet 372 of check valve 318.

Cooling system 300 also includes a controller 374 coupled to controlled components of cooling system 300, such as electronic expansion valve 306, compressor 310, pump 312, solenoid valve 314, condenser fan 378, evaporator air moving unit 380 and solenoid valve 326. Controller 374 is illustratively programmed with appropriate software that implements the control of cooling system 300 including the additional functions described below. Controller 374 may include, or be coupled to, a user interface 376. Controller 374 may illustratively be an iCOM® control system available from Liebert Corporation of Columbus, Ohio programmed with software implementing the control of cooling system 300 including the additional functions described below. In this regard, controller 374 may be programmed with software implementing the control described in U.S. Ser. No. 13/446,310 for "Vapor Compression Cooling System with Improved Energy Efficiency Through Economization" filed Apr. 13, 2012. The entire of disclosure of U.S. Ser. No. 13/446,310 is incorporated herein by reference.

Pump 312 may illustratively be a variable speed pump but alternatively may be a fixed speed pump. Condenser fan 378 may illustratively be a variable speed fan but alternatively may be a fixed speed fan. It should be understood solenoid valves 314, 316 could be types of controlled valves other than solenoid valves, such as a motorized ball valve or variable flow valve.

In DX (compressor) mode, controller 374 controls compressor 310 to be running, solenoid valve 314 to be closed, pump 312 to be off and solenoid valve 326 to be open. Since compressor 310 is running, suction at an inlet 360 of compressor 310 inlet draws vaporized refrigerant from an outlet 358 of evaporator 304 into compressor 310 where it is compressed by compressor 310, raising its pressure. The suction at the inlet 360 of running compressor 310 will draw the refrigerant into the inlet 360 and it doesn't flow through check valve 318. The refrigerant then flows through check valve 320 into condenser 308 where it is cooled and condensed to a liquid state. The cooled refrigerant flows out of condenser 308 and through receiver/surge tank 324 and check valve 322 or through bypass line 332, whichever presents the path of least resistance, to a junction of inlet 334 of pump 312 and inlet 336 of check valve 316. Since solenoid valve 314 is closed and pump 312 is off, the refrigerant flows through check valve 316, through electronic expansion valve 306 where its pressure is reduced and then into evaporator 304. The refrigerant flows through evaporator 304, where it is heated to vaporization by air to be cooled flowing through evaporator 304, and then back to the inlet 360 of compressor 310.

When controller 374 switches cooling circuit 302 to the pumped refrigerant economizer mode, it purges receiver/surge tank 324 by closing solenoid valve 326 before turning compressor 310 off. It is this control of solenoid valve 326 and compressor 310 that causes the purge of refrigerant out of receiver/surge tank 324 when cooling system 300 switches from the direct expansion mode to the pumped refrigerant economizer mode. Controller 374 switches cooling circuit 302 to the pumped refrigerant economizer mode when the outdoor air temperature is sufficiently low to provide the requisite cooling to the refrigerant being circulated in the cooling circuit, as described in the above referenced U.S. Ser. No. 13/446,310 for "Vapor Compression Cooling System with Improved Energy Efficiency Through Economization" filed Apr. 13, 2012. Controller 374 then opens solenoid valve 314, turns compressor 310 off and pump 312 on. Pump 312 then pumps the refrigerant to circulate it and it flows through solenoid valve 314, electronic expansion valve 306, evaporator 304, check valve 318 bypassing compressor 310, through condenser 308 and back to an inlet 328 of pump 312.

Figure 4:
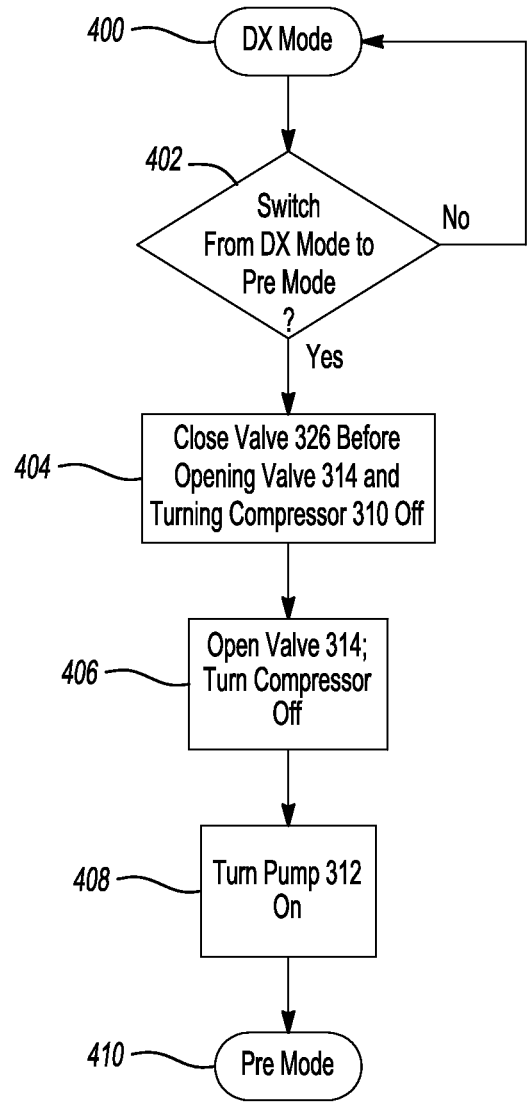
FIG. 4 is a flow chart showing an illustrative control of the cooling system of FIG. 3 to purge the receiver/surge tank when the cooling system is switched from the DX mode to the pumped refrigerant economizer mode.

FIG. 4 is a basic flow chart for a software routine for control of the purge of receiver/surge tank 324 in accordance with an aspect of the present disclosure when cooling circuit 302 of cooling system 300 is switching from the DX mode to the pumped refrigerant economizer mode. The software is illustratively implemented in controller 374. At 400, the cooling system is in the DX mode. At 402, controller 374 checks whether cooling system 302 is switching from the DX mode to the pumped refrigerant economizer mode. If so, at 404 controller 374 closes solenoid valve 326. After doing so, at 406, controller 374 then opens solenoid valve 314 and turns compressor 310 off. After turning compressor 310 off, controller 374 turns pump 312 on at 408. Since switching the cooling circuit 302 from the DX mode to the pumped refrigerant economizer mode can occur when there is a high refrigerant charge in receiver/surge tank 324, purging the receiver/surge tank 324 in accordance with the foregoing purges the refrigerant charge from receiver/surge tank 324 before operating cooling circuit 302 in the pumped refrigerant economizer mode.

With the receiver/surge tank 324 at a high pressure when the compressor 310 is turned off, system pressure drops immediately and a significant pressure drop across check valve 322 is induced. The pressure drop induced across check valve 322 may for example be about 125 PSID (pounds per square inch differential). This pressure differential causes check valve 322 to open and forces the refrigerant to flush out of receiver/surge tank 324. When pressure is equalized across check valve 322, check valve 322 closes and prevents refrigerant from re-entering receiver/surge tank 324 from bypass line 332. Cooling circuit 302 is now "over charged" in the pumped refrigerant economizer mode. By "over charged," it is meant that there is more refrigerant charge than necessary to operate the system. This provides more reliable operation of pump 312.

In general, too much charge in the direct expansion mode will cause the cooling system to go out on "high head pressure" while too little charge will cause the net positive suction head available to drop, causing a decrease in pump performance. In other words, the system will run better in the pumped refrigerant economizer mode with too much charge, but may go out on "high head" in the direct expansion mode with too much charge. Foregoing aspects of the present disclosure allow the cooling system to run with a "correct charge" in the direct expansion mode but with an "over charge" in the pumped refrigerant economizer mode. This allows the pump to run with more stability and also allows the cooling system to operate in the pumped refrigerant economizer mode at higher outdoor temperatures, which increases the cooling system's annual efficiency.

In an aspect, an inverted trap (not shown) may be coupled between outlet 343 of solenoid valve 314 and inlet 350 of electronic expansion valve 306.

The discussions of the cooling circuit of FIG. 3 was based on a one circuit cooling system. It should be understood that the cooling circuit of FIG. 3 can be utilized for staged cooling, such as in the staged cooling disclosed in the above referenced U.S. Ser. No. 13/446,310 for "Vapor Compression Cooling System with Improved Energy Efficiency Through Economization" filed Apr. 13, 2012.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term controller, control module, control system, or the like may refer to, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. The term module may include memory (shared, dedicated, or group) that stores code executed by the processor.

The term software, as used above, may refer to computer programs, routines, functions, classes, and/or objects and may include firmware, and/or microcode.

The apparatuses and methods described herein may be implemented by software in one or more computer programs executed by one or more processors of one or more controllers. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A cooling system, comprising:
a cabinet having an air inlet and an air outlet and a cooling circuit that includes an evaporator disposed in the cabinet, a condenser, a compressor, an expansion device, a liquid pump, and a receiver/surge tank coupled between the condenser and the liquid pump;
the cooling system having a direct expansion mode wherein the compressor is on and compresses a refrigerant in a vapor phase to raise its pressure and thus its condensing temperature and refrigerant is circulated around the cooling circuit by the compressor and a pumped refrigerant economizer mode wherein the compressor is off and the liquid pump is on and pumps the refrigerant in a liquid phase and refrigerant is circulated around the cooling circuit by the liquid pump and without compressing the refrigerant in its vapor phase; and
when the cooling system switches from the direct expansion mode to the pumped refrigerant economizer mode, refrigerant is flushed from the refrigerant/surge tank so that the cooling circuit is over charged when it begins operating in the pumped refrigerant economizer mode.

2. The cooling system of claim 1 including a controller coupled to the liquid pump and the compressor that turns the compressor off and the liquid pump on to operate the cooling circuit in the pumped refrigerant economizer mode and turns the compressor on to operate the cooling circuit in the direct expansion mode.

3. The cooling system of claim 2 wherein the cooling circuit includes a controlled valve at an inlet of the receiver/surge tank, a check valve coupled between an outlet of the receiver/surge tank and an inlet of the pump, and a bypass line coupled between an inlet of the controlled valve and a junction of an outlet of the check valve and an inlet of the pump, the controlled valve controlled by the controller to be open when the cooling system is in the direct expansion mode and closed when the cooling system is in the pumped refrigerant economizer mode wherein when the cooling system switches from the direct expansion mode to the pumped refrigerant economizer mode, the controller closes the controlled valve, then turns the compressor off and then turns the pump on.

4. In a cooling system having a cabinet having an air inlet and an air outlet and a cooling circuit that includes an evaporator disposed in the cabinet, a condenser, a compressor, an expansion device, a liquid pump, and a receiver/surge tank coupled between the condenser and the liquid pump, the cooling system having a direct expansion mode wherein the compressor is on and compresses a refrigerant in a vapor phase to raise its pressure and thus its condensing temperature and refrigerant is circulated around the cooling circuit by the compressor and a pumped refrigerant economizer mode wherein the compressor is off and the liquid pump is on and pumps the refrigerant in a liquid phase and refrigerant is circulated around the cooling circuit by the liquid pump and without compressing the refrigerant in its vapor phase, a method of switching the cooling system from the direct expansion mode to the pumped refrigerant economizer mode so that the cooling circuit is overcharged when it begins operating in the pumped refrigerant economizer mode, comprising:
flushing refrigerant from the receiver/surge tank when switching the cooling system from the direct expansion mode to the pumped refrigerant economizer mode so that the cooling circuit is over charged when it begins operating in the pumped refrigerant economizer mode.

5. The method of claim 4 wherein the cooling circuit includes a controlled valve at an inlet of the receiver/surge tank, a check valve coupled between an outlet of the receiver/surge tank and an inlet of the pump, and a bypass line coupled between an inlet of the controlled valve and a junction of an outlet of the check valve and an inlet of the pump, the method including opening the controlled valve when the cooling system is in the direct expansion mode and closing it when the cooling system is in the pumped refrigerant economizer mode and when the cooling system switches from the direct expansion mode to the pumped refrigerant economizer mode, closing the controlled valve, then turning the compressor off and then turning the pump on.

* * * * *